(No Model.) 3 Sheets—Sheet 3.
C. J. VAN DEPOELE.
SLOTTED CONDUIT FOR ELECTRIC CONDUCTORS.
No. 403,009. Patented May 7, 1889.
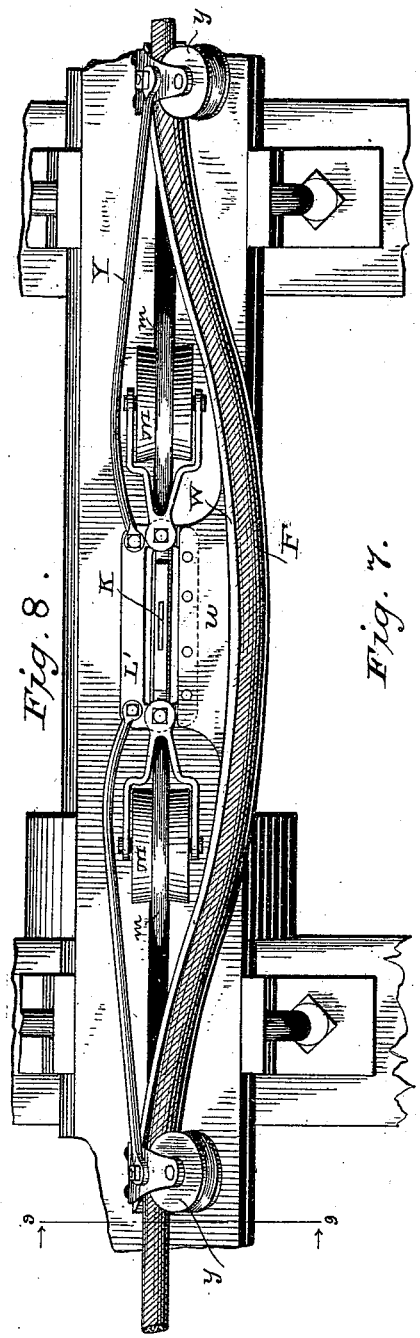
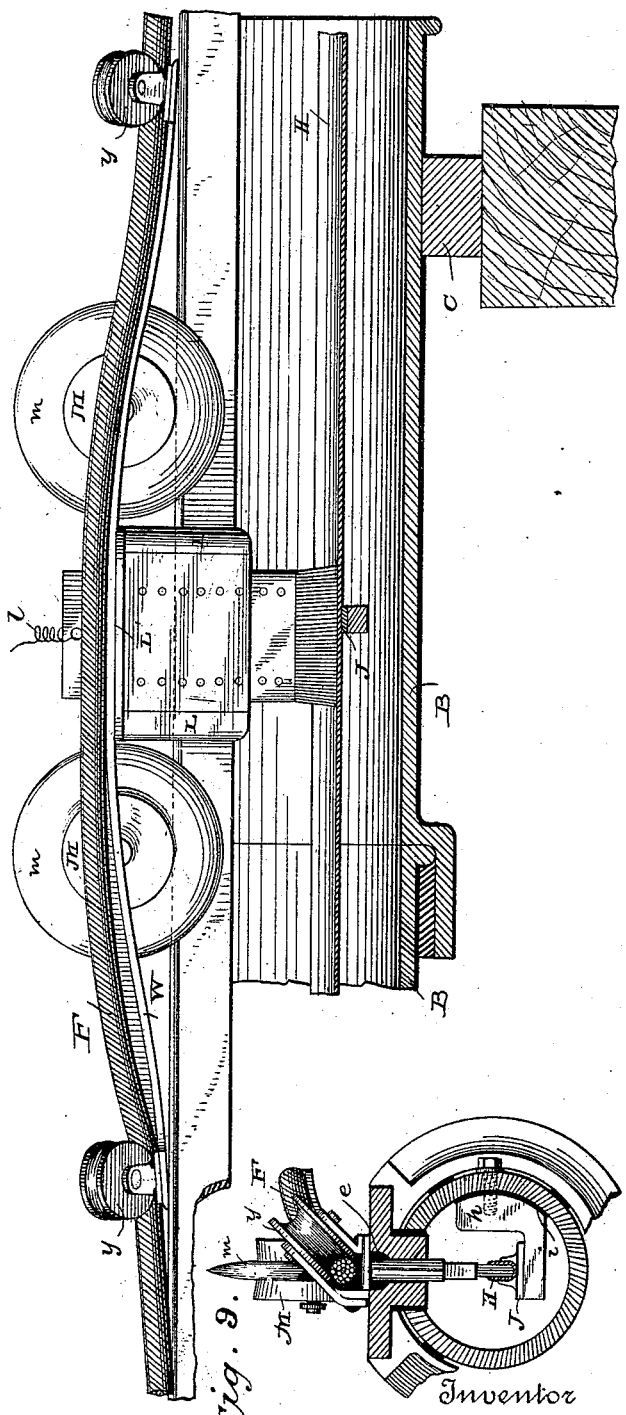
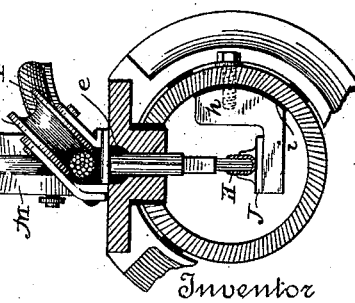
Witnesses
Wm A. Skinkle,
Arthur Johnson.
Inventor
Charles. J. Van Depoele
By his Attorney
Frankland Jannus

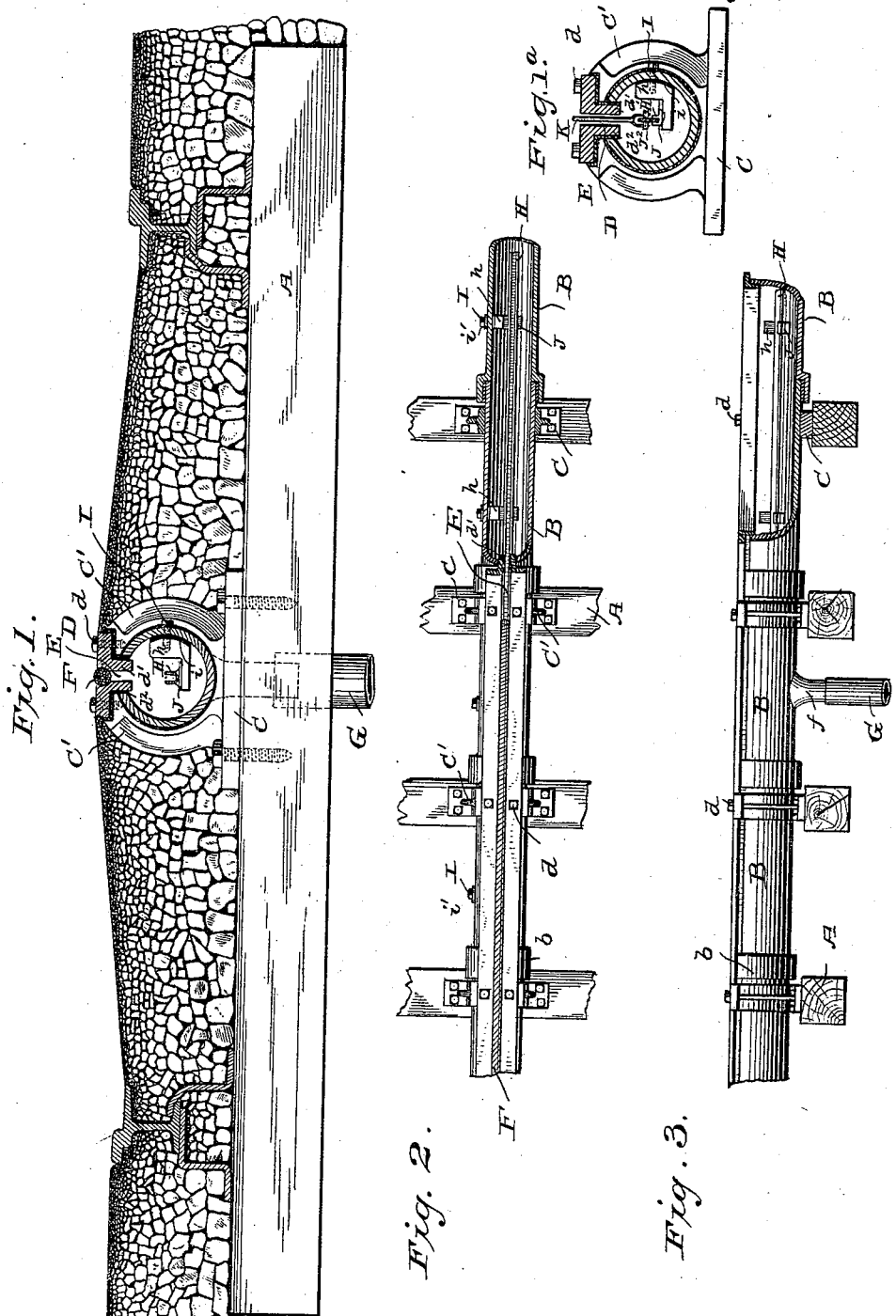

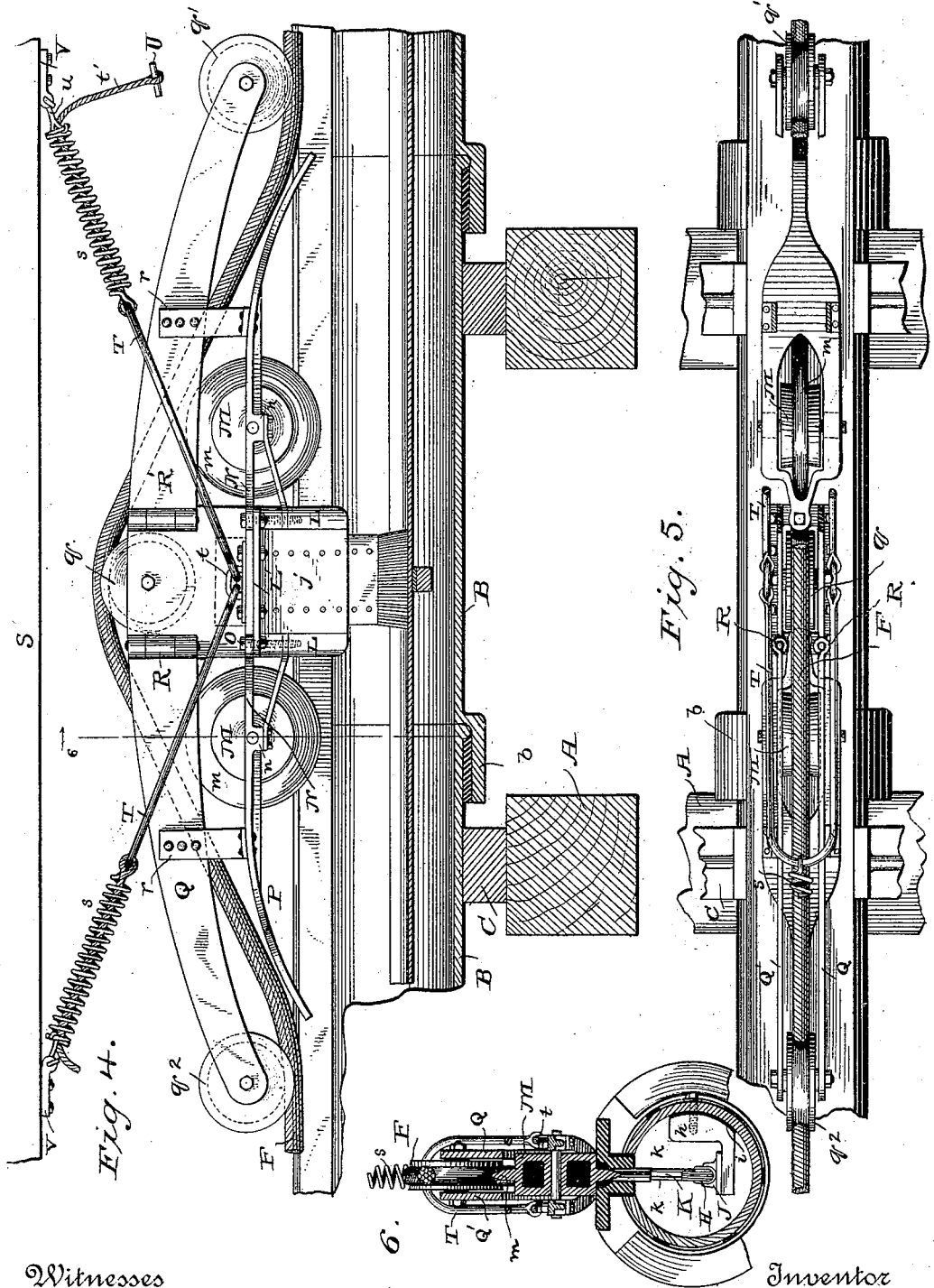

UNITED STATES PATENT OFFICE.

CHARLES J. VAN DEPOELE, OF CHICAGO, ILLINOIS.

SLOTTED CONDUIT FOR ELECTRIC CONDUCTORS.

SPECIFICATION forming part of Letters Patent No. 403,009, dated May 7, 1889.

Application filed June 6, 1888. Serial No. 276,259. (No model.)

*To all whom it may concern:*

Bè it known that I, CHARLES J. VAN DE-POELE, a citizen of the United States, residing at Chicago, in the county of Cook, State of Illinois, have invented certain new and useful Improvements in Slotted Conduits for Electric Conductors (Case No. 4,) of which the following is a description.

My invention relates to improvements in conductors for conveying electrical currents to traveling electric motors, an improved conduit for containing and protecting said conductor, and means for establishing and maintaining a moving contact between the inclosed conductor and traveling motor.

In carrying out my invention I use for the side walls of my improved conduit a slotted tube formed of vitrified pipe or other similar imperishable insulating material. Within the conduit is arranged a continuous conductor supported at a convenient distance above the bottom thereof. The walls of the conduit being in many instances of comparatively fragile material, the slotted tube constituting said walls is embraced by strong metallic yokes resting upon the cross-ties, and a strong surface-bearing is formed by bars or plates of iron or steel, preferably L-shaped in cross-section, said bars or plates extending into the slot of the conduit proper, but resting upon the supporting-yokes, so that all downward pressure is removed from the walls of the conduit.

The invention is not limited to the use of fragile imperishable material, although the means for utilizing such materials is an important feature. I propose to employ slotted tubes or troughs of vitrified fiber or similar insulating material when not too expensive. It will be understood, further, that having provided means for supporting the surface-plates and for maintaining the necessary opening between them I may construct the body of the conduit proper of a variety of materials, it being possible according to my invention to use such as have not heretofore been available for this purpose, and which in themselves possess great advantages on account of their high insulating capacity.

My invention also contemplates a structure having walls of other shapes than cylindric, as the exigences of construction and maintenance may require.

When the slot is closed by a rope or cable, as hereinafter shown and described, it may be desirable to use the U-shaped conductor shown. Where, however, the slot-closing device is dispensed with, a hollow conductor cannot be used to advantage, and in such cases I use the solid-bar conductor shown, described, and claimed in a contemporaneous application filed June 6, 1888, Serial No. 276,258.

Contact with the interior conductor is established by means of an arm extending downward through the slot and provided at its lower extremity with a metallic brush fitting in between the sides of the U-shaped conductor, or with side wheels or brushes arranged to bear laterally against the sides of the conductor when in the form of a bar. To prevent dirt, &c., from accumulating in the trough of the hollow conductor, the space between the protective capping-plates may be closed by means of a rope or cable normally resting in suitable grooves formed therein and practically closing the slot. The slot-closing rope is raised by a supporting device attached to the traveling contact, being replaced in the slot as the vehicle moves forward. Suitable outlets from the conduit are provided for water or other accumulations.

The invention relates, moreover, to various improvements in construction and arrangement, as fully hereinafter set forth, and referred to in the appended claims.

In the accompanying drawings, illustrating my invention, Figure 1 is a transverse sectional elevation showing a roadway and an electric conduit embodying my invention. Fig. 1ª is a sectional elevation of the conduit and supports, omitting the slot-closing cable, and showing a different form of conductor and contacts. Fig. 2 is a top plan view of the conduit, portions thereof being broken away to show the relative arrangement of the parts. Fig. 3 shows the conduit in elevation, portions thereof being broken away to show the interior construction. Fig. 4 is a view in elevation showing the traveling contact devices and means for removing and replacing the slot-closing cable, together with a portion of one side of the conduit structure. Fig. 5 is a top plan view of the conduit, showing the slot-closing cable and the traveling contact devices. Fig. 6 is a transverse sectional view on the line 6 6 of Fig. 4, a part of the lower portion thereof being broken away for convenience of illustration. Fig. 7 is a view in elevation showing a portion of one side of the conduit structure, the traveling contact, and a modified form of apparatus for removing and replacing the slot-closing cable. Fig. 8 is a top plan view of the devices illustrated in Fig. 7. Fig. 9 is a transverse elevation, partly in section, on the line 9 9 of Fig. 8.

Similar letters denote like parts throughout.

As illustrated in the drawings, A A indicate the cross-ties of a road-bed of a railway, of which $a$ $a$ are the rails. The conduit is preferably in the center of the roadway, and its structure includes, as herein shown, a number of short slotted sections of tube, B. The sections B may be made of any non-metallic insulating material—as, for example, vitrified earthenware, papier-maché, vulcanized fiber—or a composition of cheap insulating materials—such as bitumen, tar, and sand or ashes—or any composition not liable to destruction or to decay under the influence of heat, cold, and moisture.

As here shown, the portions of which the conduit is formed are vitrified earthenware pipe in lengths of two feet, more or less. Each joint or section B is enlarged at one end, so that they may be continuously united in the well-known manner. Cross-ties A are placed at distances corresponding to the length of the sections B, and upon each tie is secured a strong metallic chair, C, provided with upwardly-extending circular arms C′, within which the sections B fit loosely.

Capping-plates D, substantially L-shaped in cross-section, are supported upon their widest sides directly upon the upper extremities of the arms C′, from which they may be insulated, if desired, and to which they are secured by bolts $d$ or other suitable means. The depending sides $d'$ of plates D extend downward into the slot of the conduit-tube. When said plates are separated to form an open slot, E, of the desired width, the exterior surface of the depending portions $d'$ will rest against the edges of and support the sides of the conduit-tube. Any space existing between the outer circumference of the conduit and the arms C′ of the supporting-chairs may be closed by an elastic band or soft filling of tar and sawdust or tar and ashes, for which may be substituted small wedges or strips of wood, if preferred.

As shown in Figs. 1, 2, &c., the upper edges of the space forming the slot are grooved out, as indicated at $e$, to receive a rope or cable, F, by which the slot is closed and the entrance of dirt, &c., prevented. Some liquids may leak into the conduit around the slot-closing cable; but they will be carried off through drain-tubes $f$, formed in any desired number of the sections B. The drain-tubes connect with a suitable system of sewerage or catch-basins through pipes G.

As seen in Figs. 1ª and 3, the slot-closing cable and grooves $e$ are omitted.

In constructing the conduit the chairs C are first placed in position and secured to their respective cross-ties, after which the capping-plates D are fitted thereupon, forming a structure capable of supporting loaded wagons and other similar weights. The capping-plates are then removed and the sections B placed in position within their supporting-chairs. The overlapping joints $b$ are arranged, preferably, immediately in front of the chairs C. The joints are then closed with any soft or plastic water-proof composition. A mixture of tar and ashes, being very cheap and not liable to harden underground, and at the same time entirely excluding water, will answer my purpose. A rubber band or gasket might also be used. The main conductor H may be formed of a strip of copper or iron faced with copper and bent into concave or U shape, and is supported within the conduit by means of blocks $h$, of any good insulating material—for example, paraffined wood—and said blocks are held in position by bolts I, which pass through holes formed in the side walls of the sections B and into the blocks $h$. A layer of elastic material, $i$, is preferably placed between the blocks $h$ and the inner side of the walls of the conduit and a similar washer against the exterior thereof to lessen the danger of injury to the fragile material of which the conduit is composed.

The supports $h$ carry small metallic chairs J, between the perpendicular arms of which the hollow conductor H is firmly held and supported, being further secured, when necessary, by an occasional screw extending from the bottom of the conductor into the chair J. The supports $h$ being secured within the conduit and the conductors H placed in position, the capping-plates $d$ are replaced, closing the wide slot in the conduit proper and affording a rigid support for the edges $d^2$ thereof. Any suitable rope or cable may be used to prevent the entrance of dirt, &c., through the slot E between the capping-plates. The extremities of the capping-plates $d$ are electrically connected by underlapping metallic plates or otherwise, and when connected to the supply-generator will form an efficient return-conductor. This feature is, however, shown, described, and claimed in a separate contemporaneous application filed June 6, 1888, Serial No. 276,256.

As seen in Fig. 1ª, a solid-bar conductor, H′, is supported between the fingers of chairs J, such a conductor being preferable where the surface-slot is always open. Since presenting but a small horizontal surface, very little moisture or dirt can be there retained. With the bar-conductor H′, I prefer to make lateral contact—as, for example, by means of contact wheels or brushes J², suitably mounted upon the lower portion of the contact-arm K, extending into the conduit.

The traveling contact device, hereinafter referred to as the "contact-truck," may consist of a metallic arm, K, extending through the slot E and inclosed between plates $k\,k$, of insulating material, said plates extending upward above the exposed portions of the conduit and being connected to conductors 1, leading to the motor. The arm K is provided at its lower extremity with a copper brush or a number of thin copper plates extending into the hollow trough-shaped conductor, or with laterally-acting contact wheels or brushes J², engaging the conductor, so as to maintain good electrical contact therewith at whatever speed it may be moving. The arm K is provided with protecting-plates $j$ along that portion in juxtaposition to the inner edges of the capping-plates $d$. The protective plates $j$ are secured to end pieces, L, upon the upper edge of which fits a metallic frame, L'. Supporting-wheels M, formed with a flange or flanges, $m$, adapted to enter the slot E and keep said wheels in position upon the capping-plates, are pivotally secured to the ends of the frame L' and end pieces, L, by strong metallic brackets, N, pivotally secured by bolts O, passing through said plates, the extremities of the brackets, and the end pieces, the latter being suitably recessed to receive the lower portions of the brackets N.

The wheel-supporting brackets N may be formed with boxes $n$ to receive the axles of the wheels M. Extensions P are formed upon each bracket, said extensions curving downwardly and entering the slot in advance of the wheels M, so as to remove stones or other obstructions from the slot and to assist in raising the cable when necessary. A strong metallic frame composed of side pieces, Q Q', is supported upon the carrying-wheels above the brackets N. The central portion of the frame Q Q' is supported directly upon the central portion of the contact-truck, resting upon the plate L' in any convenient manner, and is provided with a grooved pulley, $q$, for carrying the slot-closing cable F over the carrying-wheels M of the contact-truck. The frame is prolonged from each end of the central portion, terminating in guide-pulleys $q'\,q^2$, the said end portions being hinged to the central portion at R R', and rigidly connected with the brackets N by metallic plates $r$ or other suitable means, so that the guide-pulleys $q'\,q^2$ move with the plows P and wheels M, following the curvature of the slot E.

The contact-truck is connected with the vehicle, the under side of which is represented at S, by suitable spiral springs, $s$. The springs $s$ may be long enough to connect directly to the contact-truck or be connected to links T, secured to bolts $t$, attached to the plate L'. Undue expansion of the springs $s$ is prevented by cords $t'$, extending therethrough and attached to the links T, said cords being of the length of the limit of expansion of said springs and provided with cross-bars or enlargements U at their outer extremities. When either of the springs is expanded to its limit, the piece U will rest against the outer coil of the spring and prevent injury. A suitable hook, $u$, is secured to the outer coil of the spring $s$ and engages a loop or ring, V, secured to the car-body S. In case the contact-truck should meet an obstruction the hook $u$ will be bent and pulled out of its fastening, and further injury to the connections avoided.

Instead of the particular form of cable-removing devices just described, I may employ a form of device comprising a metallic trough, W, curved around the carrying-wheels M, and supported at a suitable distance from the same by an extension or brace, $w$, secured to said trough and resting upon and attached to the plate L. The extremities of said trough are further braced by means of rods Y, extending from the extremities thereof, and also secured to the said plate L'. Guide-pulleys $y$ are mounted at the extremities of the trough W, between which and the extremities thereof the cable F is inserted, and by which it will be continuously removed and replaced in the trough during the progress of the contact-truck along the conduit.

That part of my invention relating to the slot-closing cable and means for removing and replacing the same during the passage of the motor-car is equally suitable to closing the surface-slot in conduits used to contain the motor-cable of a cable railway, and may without material change be applied to such purpose as well as to the one herein specifically described.

Having described my invention, what I claim, and desire to secure by Letters Patent, is—

1. A conduit for electric conductors, formed of continuously-united tubes or troughs of imperishable insulating material, as earthenware, terra-cotta, or other similar substance, rigid supports encircling the body of the conduit, and a soft or flexible packing between the conduit and its supports, substantially as described.

2. The combination of a conduit for containing electric conductors, formed of continuously-united tubes or troughs of earthenware, terra-cotta, or other similar substance, rigid supports encircling the body of the conduit, soft or flexible packing between the conduit and its supports, and surface-pieces or capping-plates resting upon said supports, substantially as described.

3. A conduit for electric conductors, comprising joined sections of solid vitrified pipe, forming a tube or trough within which the conductors are suitably supported, rigid supports encircling the body of the conduit, and soft or flexible packing between the conduit and its supports, and surface-pieces or capping-plates resting wholly upon said supports; substantially as described.

4. A conduit for electric conductors, comprising a tube or trough of fragile material, supports secured to the side walls of the tube or trough and separated therefrom by a layer of elastic insulating material, and one or more electric conductors carried upon the supports within the conduit, substantially as described.

5. A conduit for electric conductors, comprising a tubular body formed of slotted sections united by slotted joints and an elastic composition closing said joints, supports therefor encircling the body of the conduit, and surface-pieces or capping-plates resting upon the said supports and extending downwardly into the slot in the body of the conduit, substantially as described.

6. A conduit for electric conductors, formed with a slot at or near the surface of the roadway, a conductor or conductors suitably supported within the conduit, a rope or cable normally resting in the slot and closing the same, and a traveling contact extending into the conduit and establishing a traveling connection with the conductor or conductors and having a supporting-surface for raising and lowering the slot-closing cable in front and rear of the contact devices, substantially as described.

7. The combination of a conduit having a continuous slot at or near the surface of the roadway, a rope or cable normally resting in and closing said slot, and a concave conductor suitably supported within the conduit, the conductor being located vertically below the slot, substantially as described.

In testimony whereof I hereto affix my signature in presence of two witnesses.

CHARLES J. VAN DEPOELE.

Witnesses:
W. A. STILES,
JOHN EASON.